United States Patent
O'Shea

(10) Patent No.: US 8,511,414 B2
(45) Date of Patent: Aug. 20, 2013

(54) FUEL SYSTEM

(75) Inventor: Denis Martin O'Shea, Acocks Green (GB)

(73) Assignee: Goodrich Control Systems Limited, Solihull (GB)

( * ) Notice: Subject to any disclaimer, the term of this patent is extended or adjusted under 35 U.S.C. 154(b) by 572 days.

(21) Appl. No.: 11/965,100

(22) Filed: Dec. 27, 2007

(65) Prior Publication Data

US 2008/0169143 A1    Jul. 17, 2008

(30) Foreign Application Priority Data

Jan. 11, 2007   (GB) .................................. 0700511.9

(51) Int. Cl.
*G05D 7/00*   (2006.01)

(52) U.S. Cl.
USPC ...................................... 180/69.4; 60/39.281

(58) Field of Classification Search
USPC .................... 180/69.4; 60/39.281; 123/511, 123/512
See application file for complete search history.

(56) References Cited

U.S. PATENT DOCUMENTS

| | | | | |
|---|---|---|---|---|
| 2,879,643 | A | * | 3/1959 | Cowles et al. ............. 60/39.281 |
| 3,016,689 | A | * | 1/1962 | Bayer et al. ...................... 60/595 |
| 3,018,622 | A | * | 1/1962 | Werts .......................... 60/39.281 |
| 3,964,253 | A | * | 6/1976 | Paduch et al. .................... 60/790 |
| 4,736,582 | A | * | 4/1988 | Smith .......................... 60/39.281 |
| 5,003,769 | A | * | 4/1991 | Cantwell .................... 60/39.281 |
| 5,845,484 | A | * | 12/1998 | Maker ........................ 60/39.281 |
| 6,176,076 | B1 | | 1/2001 | Ford |
| 6,321,527 | B1 | | 11/2001 | Dyer et al. |
| 6,666,014 | B2 | | 12/2003 | Maillard et al. |
| 2005/0262824 | A1 | | 12/2005 | Yates et al. |

FOREIGN PATENT DOCUMENTS

| | | |
|---|---|---|
| EP | 1154137 | 11/2001 |
| EP | 1193379 | 4/2002 |
| EP | 1715161 | 10/2006 |

OTHER PUBLICATIONS

Industrial Hydraulic Technology, Parker Hannifin Corporation, Thirty-first printing, Apr. 1991, pp. 7-4 through 7-5.*
European Search Report dated Mar. 5, 2010.

* cited by examiner

*Primary Examiner* — Frank Vanaman
(74) *Attorney, Agent, or Firm* — Andrus, Sceales, Starke & Sawall, LLP

(57) ABSTRACT

A system comprises a pressure raising valve having a valve member movable within a bore between a closed position and an open position in which fuel supplied to the pressure raising valve from a metering valve, in use, is delivered to an engine manifold, the valve member being urged towards its closed position by the fuel pressure within a control chamber, the pressure raising valve including a low pressure port which communicates with the control chamber when the valve member is in its closed position, the valve member closing the low pressure port upon movement thereof away from its closed position beyond a predetermined distance.

7 Claims, 2 Drawing Sheets

FUEL SYSTEM

BACKGROUND OF THE INVENTION

This invention relates to a fuel system for an aircraft, and in particular to a fuel system having a low-pressure start-up capability.

A number of fuel systems incorporating a low pressure start-up capability are known. For example, U.S. Pat. No. 6,666,014, U.S. Pat. No. 6,321,527 and US 2005/0262824 all describe arrangements in which the pressure applied to a control chamber of a pressure raising and shut-off valve (PR-SOV) is controllable by an external valve arrangement. In U.S. Pat. No. 6,666,014, the external valve arrangement is incorporated into a metering valve, the external valve arrangement being incorporated into a pressure drop control valve in U.S. Pat. No. 6,321,527 and into a combining spill valve in US 2005/0262824.

U.S. Pat. No. 6,176,076 provides a low pressure start-up capability by providing a passive restrictor in a spill return line.

The arrangements in which an external valve arrangement is provided are fairly complex, and the passive restrictor approach to achieving a low pressure start-up results in the fuel system operating at reduced efficiency when operating at high flow or pressure conditions as the restrictor gives rise to parasitic losses from the system.

It is an object of the invention to provide a fuel system having a low pressure start-up capability which is of simple and convenient form.

SUMMARY OF THE INVENTION

According to the present invention there is provided a fuel system comprising a pressure raising valve having a valve member movable within a bore between a closed position and an open position in which fuel supplied to the pressure raising valve from a metering valve, in use, is delivered to an engine manifold, the valve member being urged towards its closed position by the fuel pressure within a control chamber, the pressure raising valve including a low pressure port which communicates with the control chamber when the valve member is in its closed position, the valve member closing the low pressure port upon movement thereof away from its closed position beyond a predetermined distance.

The pressure raising valve may comprise a pressure raising and shut-off valve (PRSOV).

It will be appreciated that, with such a system, opening of the pressure raising valve can occur when the applied pressure is relatively low, thus start-up can be achieved with an associated fuel pump operating at a relatively low speed and developing a relatively low pressure rise. Once the valve member has reached the point at which the low pressure port is closed, further movement of the valve member towards its fully open position requires the application of the normal operating fuel pressure, and so normal operation of the fuel system is not affected.

The valve member is conveniently spring biased towards its closed position.

BRIEF DESCRIPTION OF THE DRAWINGS

The invention will further be described, by way of example, with reference to the accompanying drawings, in which.

DETAILED DESCRIPTION OF THE INVENTION

The fuel system illustrated in the accompanying drawings comprises a pump unit 10 arranged to supply fuel under high pressure to a supply line 12. As illustrated, the pump unit 10 includes a pair of high pressure pumps arranged in parallel, the system being arranged such that under some engine operating conditions, one of the pumps of the pump unit 10 is unloaded, thus the output thereof is returned to an inlet, low pressure side of the pump unit 10. Although the illustrated arrangement makes use of a twin high pressure pump arrangement, the invention is also applicable to fuel systems in which a single high pressure pump is provided.

The supply line 12 supplies fuel under high pressure to a metering valve 14 which is operable to control the rate of fuel supply to a delivery line 16. The delivery line 16 supplies fuel under pressure to a pressure raising and shut-off valve (PR-SOV) 18. A pressure drop control valve 20 controls the operation of a spill valve 22 to maintain a substantially uniform pressure drop across the metering valve 14.

Figure 1:
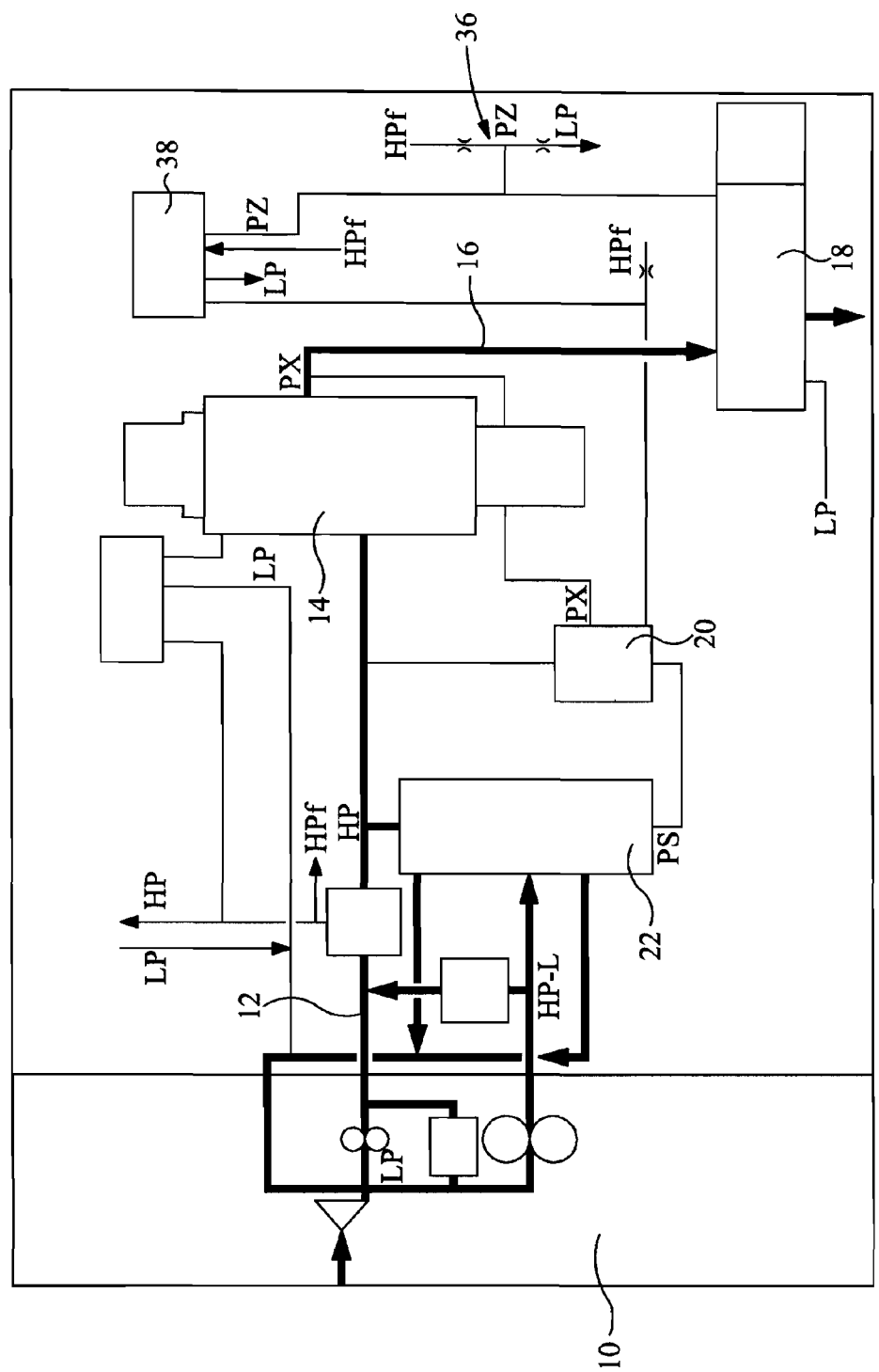
FIG. 1 is a block diagram illustrating a fuel system in accordance with an embodiment of the invention.
Figure 2:
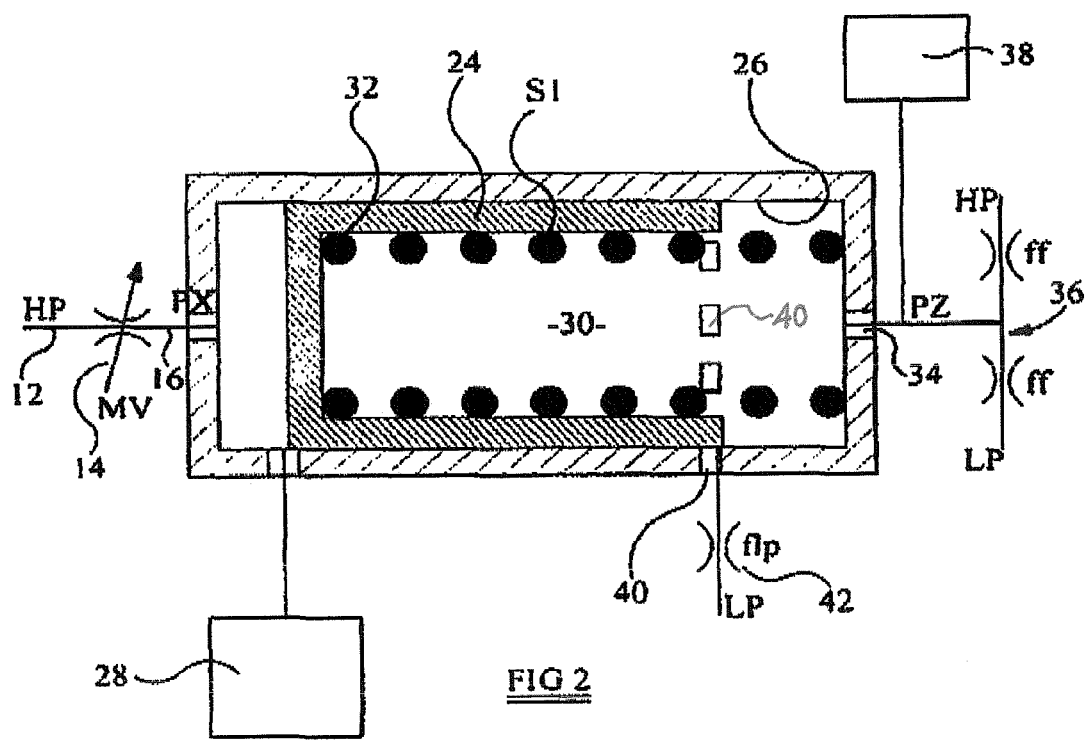
FIG. 2 illustrates part of the fuel system of FIG. 1.

As illustrated in FIG. 2, the PRSOV 18 comprises a valve member 24 slidable within a bore or sleeve 26 and movable between a closed position in which fuel supplied to the PRSOV 18 through the delivery line 16 is unable to flow to the associated engine manifold 28, and a fully open position in which such a flow of fuel is permitted. The valve member 24 and sleeve 26 together define a control chamber 30, and the action of the fuel pressure within the control chamber 30 urges the valve member 24 towards its closed position. The control chamber 30 further contains a spring 32 which is also orientated to apply a biasing force to the valve member 24 urging the valve member 24 towards its closed position. The control chamber 30 communicates via a port 34 with a fluid pressure potentiometer network 36 and with a shut-off servo valve arrangement 38.

The PRSOV 18 further includes a low pressure port 40 located such that when the valve member 24 occupies its fully closed position, the low pressure port 40 communicates with the control chamber 30. Movement of the valve member 24 away from its closed position beyond a predetermined point will result in the valve member 24 closing the low pressure port 40 thus breaking the communication between the control chamber 30 and the low pressure port 40.

In normal use of the fuel system, the pump unit 10 operates to supply the supply line 12 with fuel under high pressure. The metering valve 14 operates to control the rate of fuel supply to the delivery line 16, the pressure drop control valve 20 and spill valve 22 operating to maintain a substantially uniform pressure drop across the metering valve 14. The fuel pressure within the delivery line 16 is sufficiently high that the valve member 24 of the PRSOV 18 occupies an open position in which fuel is delivered from the PRSOV 18 to the engine manifold 28. The position of the valve member 24 is such that the low pressure port 40 is closed by the valve member 24 thus the fuel pressure within the control chamber 30 is controlled by the operation of the fluid pressure potentiometer network 36.

If it is desired to terminate the supply of fuel to the engine manifold 28, then the shut-off servo valve arrangement 38 is operated to supply fuel under high pressure to the control chamber 30. The increase in pressure in the control chamber 30, in combination with the action of the spring 32, will move the valve element 24 towards its closed position, thereby terminating the fuel supply to the engine manifold 28. It will be appreciated that the movement of the valve member 24 will result in the low pressure port 40 opening. In order to ensure that a sufficiently high pressure is maintained within the control chamber 30 during engine shut-down, a flow restrictor 42 is provided, thereby limiting the rate of fuel escape from the control chamber 30 via the low pressure port 40.

Upon engine start-up, initially the PRSOV 18 will be closed, the valve member 24 being urged towards the left in the orientation illustrated in FIG. 2. It will be appreciated that in this position, the low pressure port 40 is open, thus the fuel pressure within the control chamber 30 is relatively low. Consequently, the fuel pressure that must be developed by the pump unit 10 in order to cause the PRSOV 18 to move to a position in which fuel supply to the engine manifold 28 is permitted is relatively low, and is governed to a large extent by the rate of the spring 32. A low pressure start-up capability is thus provided. As the fuel pressure developed by the pump unit 10 rises, and hence the fuel pressure applied to the PRSOV 18 rises, the valve member 24 will move to a position in which it closes the low pressure port 40. Once the low pressure port 40 is closed, the fuel pressure within the control chamber is controlled by the fuel pressure potentiometer network 36 as outlined hereinbefore. Consequently, once the low pressure port 40 has been closed by the valve member 24, the provision of the low pressure start-up capability has no effect upon the continued operation of the fuel system.

The design of the low pressure port 40 in the sleeve 26 is such that the low pressure port 40 is closed off after a relatively small proportion of the full travel of the valve member 24 from its closed position. This is important as only a small proportion of the full travel of the valve member 24 occurs during start-up, when the relatively low system pressure rise (HP-LP) is required, whilst the majority of the travel of the valve member 24 occurs after the start-up condition and during cruise conditions, when a higher system pressure rise (HP-LP) is required.

The low pressure port may be provided in a number of ways. For example, the low pressure port 40 may comprise four rectangular slots provided in the sleeve 26, the slots each communicating with a common low pressure passage containing the restrictor 42. However, it will be appreciated that a number of other arrangements are possible.

It is envisaged that the fuel system of the present invention will provide a low pressure start-up pressure rise (HP-LP) of approximately 170 psid. Once the valve member 24 has moved to a position in which the low pressure port 40 is closed and the fuel system is operating at its normal pressure, then the system pressure (HP-LP) will be approximately 290 psid. This higher system pressure is sufficient to allow normal operation of the fuel pressure operated hydraulic actuators provided elsewhere in the fuel system.

Although in the arrangement described hereinbefore, the PRSOV 18 serves both as a pressure raising valve and also as a shut-off valve, it will be appreciated that the shut-off capability could be provided separately, in which case the low pressure port 40 would be provided in a valve serving only as a pressure raising valve.

It will be appreciated that a wide range of other modifications and alterations may be made to the fuel system described hereinbefore without departing from the scope of the invention.

The invention claimed is:

1. A fuel system comprising a pressure raising valve having a valve member movable within a bore between a closed position in which the valve member closes an outlet of the pressure raising valve and so no fuel is supplied from the pressure raising valve, in use, to an engine manifold, and fully open position in which the valve member does not obstruct the outlet and so fuel is delivered to the engine manifold, the valve member being urged towards its closed position by the fuel pressure within a control chamber connected, in use, to a high pressure fuel line, the pressure raising valve including a low pressure port connected to low pressure at start-up and which communicates with the control chamber when the valve member is in its closed position such that the pressure within the control chamber at start-up is at a first, low pressure and so allows opening of the pressure raising valve at a reduced system pressure, the valve member closing the low pressure port upon commencement of movement thereof away from its closed position towards the fully open position to open the outlet thereby breaking the connection of the control chamber to low pressure and so allowing, the pressure within the control chamber to rise, to a second, higher pressure the low pressure port being closed by the valve member when the valve member occupies an intermediate position between the closed and fully open positions.

2. A system according to claim 1, wherein the pressure raising valve comprises a pressure raising and shut-off valve (PRSOV).

3. A system according to claim 1, wherein the valve member is spring biased towards its closed position.

4. A system according to claim 1, wherein the low pressure pot comprises a plurality of openings formed in a sleeve.

5. A system according to claim 4, wherein the openings are of rectangular shape.

6. A system according to claim 1, further comprising a flow resistor formed in a low pressure line communicating with the low pressure port.

7. A system according to claim 1, further comprising a fluid pressure potentiometer network communicating with the control chamber.

* * * * *